Figure 1:
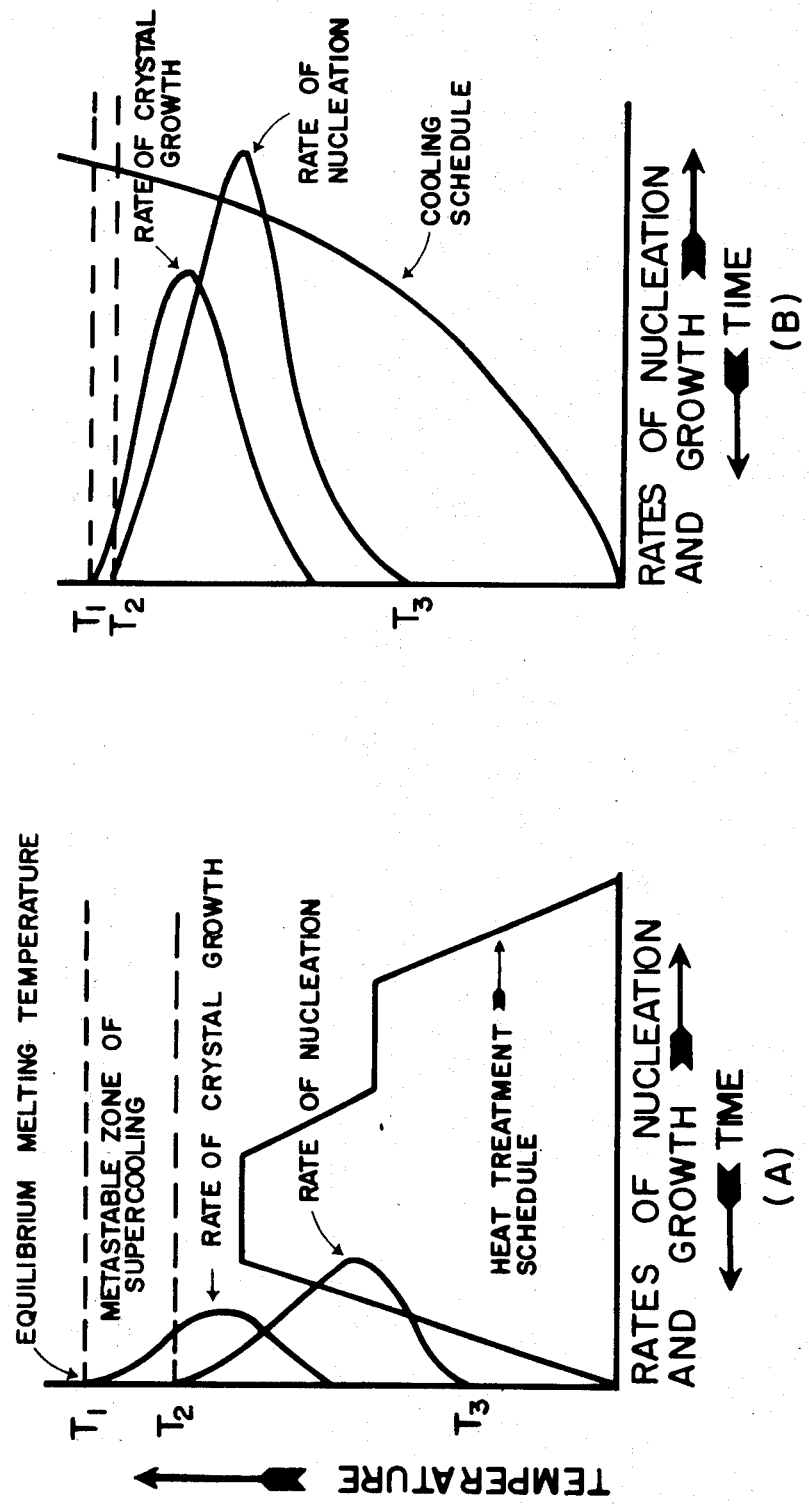

United States Patent [19]

Grossman

[11] 3,985,531

[45] Oct. 12, 1976

[54] SPONTANEOUSLY-FORMED FLUORMICA GLASS-CERAMICS

[75] Inventor: David G. Grossman, Corning, N.Y.

[73] Assignee: Corning Glass Works, Corning, N.Y.

[22] Filed: Mar. 19, 1975

[21] Appl. No.: 559,725

[52] U.S. Cl. .................................. 65/33; 106/39.6
[51] Int. Cl.² ..................... C03B 32/00; C03C 3/22
[58] Field of Search ................ 106/39.6, 39.7, 39.8; 65/33

[56] References Cited
UNITED STATES PATENTS 3,804,608 4/1974 Gaskell et al. ...................... 106/39.7
3,839,056 10/1974 Grossman ........................... 106/39.6

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

This invention relates to the manufacture of articles exhibiting the physical properties and internal microstructure of glass-ceramics but which can be formed spontaneously from a glass-forming melt, i.e., the heat treatment of a glass body to cause the crystallization in situ thereof conventional in the production of glass-ceramic articles is not required. More particularly, this invention is concerned with the manufacture of glass-ceramic articles having compositions within the $Na_2O$-$MgO$-$SiO_2$-F field, wherein a fluormica constitutes the primary crystal phase, which can be formed spontaneously from a molten glass batch.

3 Claims, 3 Drawing Figures

SPONTANEOUSLY-FORMED FLUORMICA GLASS-CERAMICS

U.S. applications Ser. Nos. 559,731 and 559,730, filed concurrently herewith by H. L. Rittler, describe the production of spontaneously-formed glass-ceramic articles wherein BaO and/or SrO-$Fe_2O_3$-$SiO_2$ solid solution and carnegieite and/or nepheline solid solution, respectively, constitutes the primary crystal phase. U.S. application Ser. No. 559,786, filed concurrently herewith by G. H. Beall, discloses the formation of spontaneously-formed glass-ceramic articles wherein alpha-quartz comprises the predominant crystal phase. U.S. application Ser. No. 559,788, filed concurrently herewith by G. H. Beall, P. E. Blaszyk, and W. T. Brydges, III, discusses the production of spontaneously-formed glass-ceramic articles wherein beta-spodumene solid solution constitutes the principal crystal phase. United States application Ser. No. 559,787, filed concurrently herewith by the present applicant discloses the manufacture of spontaneously-formed glass-ceramic articles wherein a fluormica comprises the primary crystal phase. Finally, U.S. application Ser. Nos. 559,787, 559,789, and 559,726, also filed concurrently herewith by the present applicant, describe the formation of spontaneously-formed glass-ceramic articles wherein beta-spodumene solid solution, mullite, and celsian, respectively, constitutes the predominant crystal phase.

The art of glass-ceramics was founded in U.S. Pat. No. 2,920,971. As described therein, the classic glass-ceramic article is produced through the controlled heat treatment of a precursor glass body. Hence, the manufacture of a glass-ceramic article customarily involves three general steps. A glass-forming batch, to which a nucleating agent is commonly added, is melted. The melt is then simultaneously cooled to a temperature at least within and, commonly, below the transformation range thereof to yield an essentially crystal-free glass and an article of a desired geometry shaped therefrom. Thereafter, the glass shape is heated to a temperature above the transformation range thereof to cause the growth of crystals therein. In most instances, this crystallization treatment will comprise two steps. In the first, the glass shape will be heated to a temperature slightly above the transformation range and maintained thereat for a sufficient length of time to achieve substantial nucleation. In the second step, the nucleated body will be heated to a higher temperature, frequently above the softening point of the precursor glass, to cause the growth of crystals on these nuclei. [The transformation range has been defined as that temperature at which a molten mass is converted to an amorphous solid and has generally been deemed to lie in the vicinity of the annealing point of a glass.]

As a result of this careful heat treatment of the glass body, a homogeneously crystallized article is produced wherein the crystals are relatively uniform in size. In general, glass-ceramic articles are highly crystalline and the crystals, themselves, very finegrained. However, as was noted above, for a detailed discussion of the theoretical aspects and practical considerations intrinsic to glass-ceramic article production, reference is called to U.S. Pat. No. 2,920,971.

It has frequently been observed in cooling molten batches into glass bodies that crystallization will occur, ordinarily originating from the surface and growing inwardly. This phenomenon has been referred to as "normal" devitrification and is almost always deemed undesirable, because the resultant microstructure consists of nonuniformly sized, relatively coarse crystals which are often oriented in a plane normal to the surface. Such a microstructure customarily provides mechanically weak bodies.

Fundamentally, this "normal" devitrification phenomenon differs from the production of glass-ceramic articles in that it involves crystallization taking place at or near the liquidus temperature. The fusion casting of refractory ceramic materials is another example of crystallization occuring at or near the liquidus. Inoculation procedures have been developed in an attempt to nucleate a fine-grain structure to thereby ameliorate the inherent weakness of coarse-grain microstructures. In contrast, the production of glass-ceramic articles through the controlled crystallization of glass bodies contemplates temperatures much below the liquidus (a larger degree of supercooling), such that the crystallization process takes place at a much higher viscosity level where time can be used to influence the nucleation and crystal growth rates.

The present invention relates to spontaneously-formed glass-ceramic articles, that is, articles exhibiting physical behavior and microstructures akin to those of conventional glass-ceramic bodies, but which can be produced through the simple cooling of a molten mass with no subsequent heat treatment of a glass body being required. Thus, certain compositions within the $Na_2O$-MgO-$SiO_2$-F field, when cooled from a melt, will provide a uniform homogeneous dispersion of crystals within a glassy matrix without the need for any further heat treatment. In these compositions, the crystals have been found to comprise the predominant proportion of the total volume of the body, i.e., greater than about 50% by volume, and are commonly less than about 5 microns in diameter.

It is believed that FIG. 1 can be useful in arriving at an understanding of the difference in crystallization mechanism involved between the instant spontaneously-formed glass-ceramic bodies and the conventional glass-ceramics. The key is believed to lie in the overlap of the rate curves for nucleation and crystallization pictured there. Hence, below the equilibrium melting temperature of a viscous liquid, $T_1$, there is a temperature interval in which nuclei do not form a detectable rate. This range of temperatures ($T_1$-$T_2$) is the metastable zone of supercooling. With conventional glass-ceramic composition systems, no crystals form at or just below the metastable zone because of the low rate of nucleation existing there. Thus, nucleation occurs within the temperature interval $T_2$-$T_3$.

The crystallization process utilized in the production of conventional glass-ceramic bodies is illustrated in FIG. 1(A). As is pictured there, crystallization is secured by reheating the supercooled liquid (a glass body) first into the temperature region of maximum nucleation, holding thereat for a sufficient length of time to achieve the substantial development of nuclei, and then into the region of maximum crystal growth where it is held to complete the crystallization.

FIG. 1(B) depicts the nucleation-crystallization relationship obtaining in the case of spontaneously-formed glass-ceramics. As can be observed, the metastable zone of supercooling is much foreshortened and the rates of nucleation and crystal growth much greater. Under such circumstances, nucleation and crystallization can take place with sufficient rapidity at temperatures just below the zone of metastable supercooling that substantial dwell times within those respective regions are not demanded. Thus, a simple cooling schedule applied to the melt will be adequate to produce a body having a uniform crystal dispersion therein.

It is believed likely that the nucleation rate is enhanced in the composition system of the instant invention by a concurrently-occurring phase separation phenomenon. Spontaneous opal glasses resulting from phase separation are well-known in fluorine-containing glass systems.

U.S. Pat. No. 3,804,608 discloses a number of compositions which can be formed into glass-ceramic article without employing the reheating step required in the production of conventional glass-ceramic bodies. However, no mention is made therein of compositions within the $Na_2O$-$MgO$-$SiO_2$-F field which can be crystallized to articles having a microstructure akin to conventional glass-ceramic articles and wherein the predominant crystal phase is a fluormica.

The glasses of the present invention which are capable of being spontaneously crystallized into glass-ceramic articles consist essentially, by weight on the oxide basis as calculated from the batch, of about 5–15% $Na_2O$, 10–20% $MgO$, 65–76% $SiO_2$, and 5–10% F. In the preferred embodiment, the compositions will consist solely of the four constituents to insure uniformity of crystallinity in the final product. Nevertheless, minor additions of various compatible metal oxides can be tolerated up to a total of about 10% by weight. For example, such materials as $Li_2O$, $K_2O$, $B_2O_3$, $Al_2O_3$, SrO, and $Fe_2O_3$ can enter into the fluormica structure without destroying the basic structural nature thereof. However, $P_2O_5$ and, in some instances, $B_2O_3$ may be incorporated into the residual glassy matrix which will lower the temperture capabilities of the glass-ceramic and sharply alter the coefficient of thermal expansion thereof.

Table I records a group of glass compositions, expressed in parts by weight on the oxide basis as calculated from the batch, which were subjected to the process parameters of the instant invention. However, inasmuch as the totals of the individual batches equal or approximate 100, the value recorded for each component may reasonably be deemed to be reported in terms of percent. Since it is not known with which cation(s) the fluorine is combined, it is reported as fluoride (F) and the oxygen≈fluorine correction factor reported in accordance with conventional glass analysis practice. Fluorine volatilization during melting will average about 25–50%, depending upon the melting temperatures used. The actual batch ingredients may comprise any materials, either the oxide or other compounds, which, when melted together, will be converted to the desired oxide in the proper proportions. In the compositions recorded in Table I, $MgF_2$ was employed to provide the fluoride content.

The batch ingredients were blended together in a ballmill to aid in achieving a homogeneous melt and then turned into a platinum crucible. After covering, the crucible was placed in an electrically-fired furnace and the batch melted at 1450°–1500°C. for about four hours. The melt was thereafter poured into a graphite or steel mold to yield a slab about 6 × 6 × ½ inch. After allowing the slab to cool in the ambient environment to about 750°–850°C., as measured by means of an optical pyrometer, this cooling requiring about one minute, it was transferred to an annealer operating at about 650°–700°C., depending upon the composition of the starting batch.

Table I

|  | 1 | 2 | 3 | 4 | 5 | 6 | 7 |
|---|---|---|---|---|---|---|---|
| $Na_2O$ | 10.6 | 8.1 | 10.7 | 8.5 | 8.6 | 8.0 | 10.6 |
| MgO | 13.7 | 17.5 | 17.3 | 15.3 | 15.4 | 15.5 | 13.7 |
| $SiO_2$ | 71.9 | 70.6 | 67.2 | 72.4 | 73.2 | 72.3 | 71.6 |
| F | 6.5 | 6.6 | 8.2 | 6.5 | 4.6 | 7.2 | 7.1 |
|  | 102.7 | 102.8 | 103.4 | 102.7 | 101.8 | 103.0 | 103.0 |
| O≈F | −2.7 | −2.8 | −3.4 | −2.7 | −1.8 | −3.0 | −3.0 |
|  | 100.0 | 100.0 | 100.0 | 100.0 | 100.0 | 100.0 | 100.0 |
|  | 8 | 9 | 10 | 11 | 12 | 13 |  |
| $Na_2O$ | 11.6 | 9.4 | 12.6 | 13.8 | 6.4 | 6.3 |  |
| MgO | 13.7 | 11.6 | 13.7 | 13.8 | 14.9 | 13.1 |  |
| SiO | 70.6 | 75.4 | 69.3 | 68.7 | 74.9 | 76.8 |  |
| F | 7.1 | 6.4 | 7.7 | 6.5 | 6.5 | 6.5 |  |
|  | 103.0 | 102.8 | 103.3 | 102.8 | 102.7 | 102.7 |  |
| O≈F | −3.0 | −2.7 | −3.2 | −2.7 | −2.7 | −2.7 |  |
|  | 100.0 | 100.1 | 100.1 | 100.1 | 100.0 | 100.0 |  |

As the molten batch cooled, the melt seemed to stiffen in the normal manner until a temperature of about 950°–1000°C. was reached, as determined by an optical pyrometer. At or about that temperature range, a hazy opalization was observed in the surface of the slab and at the edges thereof which quickly moved toward the center of the slab. A wave of opaque crystallization followed closely behind.

The formation of this opalization is demanded to secure the subsequent growth of the desired fluormica crystallization. An examination of FIG. 1(B) can be helpful in arriving at an understanding for this. Hence, as is pictured therein, there must be a very high degree of nucleation at temperatures near or at the optimum growth temperature to assure fine-grained crystallization as the melt cools. This nucleation, customarily taking place at about 100°–300°C. above the annealing point of the glass, appears to be supplied contemporaneously with the opalization phenomenon.

Nevertheless, although spontaneous opalization has been observed in numerous glasses, unless one of the amorphous phases involved in the opalization is at least partially unstable as a glass such that crystallites of some type are precipitated to function as nuclei, there will be no subsequent spontaneous crystallization of the major glass components. Therefore, whereas the mechanism working to provide the growth of crystals is not fully understood, it is believed that crystallites formed at temperatures well above the annealing point of the glass during or immediately after the opalization phenomenon, which provide available nuclei for the growth of crystals as the glass moves into the temperature region for maximum crystallization.

to be a tetrasilicic variety having the probable formula $NaMg_{2.5}Si_4O_{10}F_2$.

TABLE II

| Example No. | Visual Description | Crystal Phases | Coef. Exp. (×10 $^7$/°C.) |
|---|---|---|---|
| 1 | Very fine-grained, shiny fracture, translucent | sodium tetra-silicic mica | 80.0 |
| 2 | Fine-grained, smooth fracture, opaque | " | 50.5 |
| 3 | Fine-grained, smooth dull fracture, opaque | " | — |
| 4 | " | " | 49.1 |
| 5 | Light opal glassy appearance | None | 70.1 |
| 6 | Fine-grained, smooth dull fracture, opaque | sodium tetra-silicic mica | 65.3 |
| 7 | Medium opal glassy appearance | " | 15.6 |
| 8 | Very fine-grained, silky fracture, opaque | " | 110 |
| 9 | " | " | 60.9 |
| 10 | Fine-grained, smooth fracture, opaque | " | 97.2 |
| 11 | Medium opal glassy appearance | " | 97.9 |
| 12 | Fine-grained, smooth dull fracture, opaque | " | 52.5 |
| 13 | Coarse-grained, sugary fracture | " | — |

Table II provides a summary of the physical characteristics observed when the slabs were removed from the annealer. Thus, a visual description of the slab exterior and a fractured surface is provided and the crystal phases observed in each as determined through X-ray diffraction analysis. Also, the coefficient of thermal expansion is reported as measured over the range of room temperature to 500°C. in the conventional manner on bar samples cut from the slab.

Figure 2:

The characteristic microstructure of the highly-crystalline slabs can be viewed in FIG. 2 which is a replica electron micrograph of the product of Example 4. The white bar at the base of the photomicrograph represents a distance of one micron. The micrograph reveals a crystal growth pattern superimposed upon a phase separated glass. The exact role which the phase separation plays in influencing the nucleation and crystal growth rates is not fully understood at this time. However, the platey nature of the crystals is quite apparent, with the mica platelets being grouped in clusters of about 1–2 microns in diameter and having grown around the phase separated droplets which are believed to precede the mica development.

High temperature viscosity measurements have indicated a "setting point" in the temperature interval between about 950°–1250°C. It has been theorized that this "setting point" probably corresponds to the onset of crystallization which could thus account for a sudden increase in apparent viscosity.

The micas constitute a family of silicate minerals having a unique two-dimensional or sheet structure. Most naturally-occurring micas are hydroxyl silicates, whereas micas produced synthetically have commonly involved replacing the hydroxyl groups within the crystal structure with fluorine. These synthetic micas have been termed fluormicas as a result of that substitution. That terminology is employed here.

The crystal phase observed to form in accordance with the method of this invention is a fluormica which could not be positively identified. The X-ray diffraction pattern exhibits the characteristics of a 1M polymorph and, because there are no available trivalent cations to substitute for silicon, the sodium fluormica is reasoned The criticality of composition is evidenced in Examples 5 and 13. Thus, where fluoride is present in amounts less than about 5% (Example 5), the fluormica crystallization does not appear. Example 13 points to the coarse-grained body obtained where excess $SiO_2$ is present.

The process of the instant invention can be summarized as consisting of four general steps. First, a glass-forming batch having a composition within the above-stated ranges is melted. Second, the molten batch is simultaneously cooled to a temperature about 100°–300°C. above the annealing point of the glass to produce phase separation and nucleation and a glass body shaped therefrom. Third, the glass body is exposed to a temperature between the annealing point of the glass and the temperature of phase separation and nucleation for a period of time sufficient to cause crystallization of the desired fluormica phase. Fourth, the crystallized body is cooled to room temperature.

As has been explained above, the second or phase separation step is of vital significance to the successful operation of the invention. Therefore, the rate of cooling to which the molten batch is subjected must not be so rapid that adequate time is not provided for the required phase separation and nucleation to occur. With the glass compositions of the instant invention, laboratory experimentation has demonstrated that cooling rates between about 10°–1000°C./minute assure satisfactory phase separation and nucleation. These reactions commonly occur at temperatures between about 850°–1000°C.

Since the compositions of this invention crystallize very rapidly after the appearance of the opalization, exposure times of as little as two minutes within the crystallization range may be sufficient to achieve the desired high crystallinity, i.e., at least 50% by volume of the body. Customarily, the crystallization will take place at temperatures between about 650°–850°C. However, as was illustrated above in the specific examples of the invention, ease in production has recommended that the phase separated and nucleated body be placed into an annealer operating at a temperature within or slightly above the crystallization range. Methods and apparatus conventional in the glassmaking art are similarly appropriate here. Annealing schedules as brief as 0.5 hour can be successfully utilized, but the more usual practice contemplates periods up to two hours or longer. Nevertheless, the internal microstructure and the physical properties of the final product do not appear to be significantly affected by very long annealing schedules. Thus, such are not generally viewed with much favor from a practical point of view.

Although the preferred practice of the invention is founded upon crystallizing the article as the phase separated and nucleated glass body is cooled to room temperature, it is possible to cool the melt to room temperature at such a rapid rate that phase separation and nucleation will take place but the desired crystallization will not, resulting in a body that is essentially glassy. However, the desired crystallization can be attained by exposing the glassy body to a temperature within the crystallization range in like manner to that described above when the melt is simply cooled to room temperature. Hence, again, it is the occurrence of phase separation and nucleation at temperatures above the crystallization range which is of critical importance to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism by which this improvement in mechanical strength is imparted is not fully comprehended, although it is believed to involve the small amount of residual glass which it thought to exist as a continuous phase throughout the crystallized body. This assumption is believed to be supported by a study of FIG. 2 wherein the residual glass is seen as depressed regions due to its greater solubility in the etchant used to produce the replica electron micrograph.

I claim:

1. A method for making a highly crystalline glass-ceramic article consisting essentially of fluormica crystals dispersed within a glassy matrix, said crystals constituting the predominant proportion of said article, which comprises the steps of:
    a. melting a batch for a glass consisting essentially, by weight on the oxide basis, of about 5–15% $Na_2O$, 10–20% $MgO$, 65–75% $SiO_2$, and 5–10% F;
    b. simultaneously cooling said melt at a rate between about 10°–1000°C./minute to a temperature about 850°–1000°C. to shape said melt into a glass body and secure phase separation and nucleation therein;
    c. further cooling said shaped glass body and exposing said glass body to a temperature between about 650°–850° C. for a sufficient length of time to cause crystallization of the fluormica phase in said glass body; and then
    d. cooling the crystallized body to room temperature.

2. A method according to claim 1 wherein said time sufficient to cause crystallization is at least about two minutes.

3. A method according to claim 1 wherein said crystallized article is cooled to room temperature by means of a quick chilling technique to thermally temper said article.

* * * * *

UNITED STATES PATENT AND TRADEMARK OFFICE
CERTIFICATE OF CORRECTION

PATENT NO. : 3,985,531

DATED : October 12, 1976

INVENTOR(S) : David G. Grossman

It is certified that error appears in the above-identified patent and that said Letters Patent are hereby corrected as shown below:

Column 1, line 23, "559,787" should be -- 559,727 --.

Column 1, line 59, "finegrained" should be -- fine-grained --.

Columns 5 and 6, Table II, Heading "Coef. Exp. (x10 $^{7}$/°C.)" should be -- Coef. Exp. (x10 $^{-7}$/°C.) --.

Figure 1 as shown on the attached sheet should appear on the cover sheet of printed patent.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*

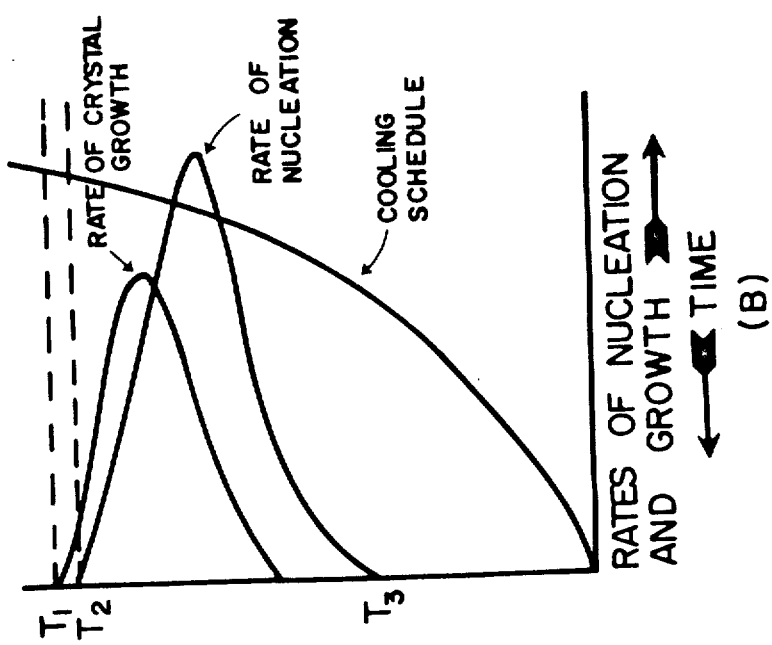
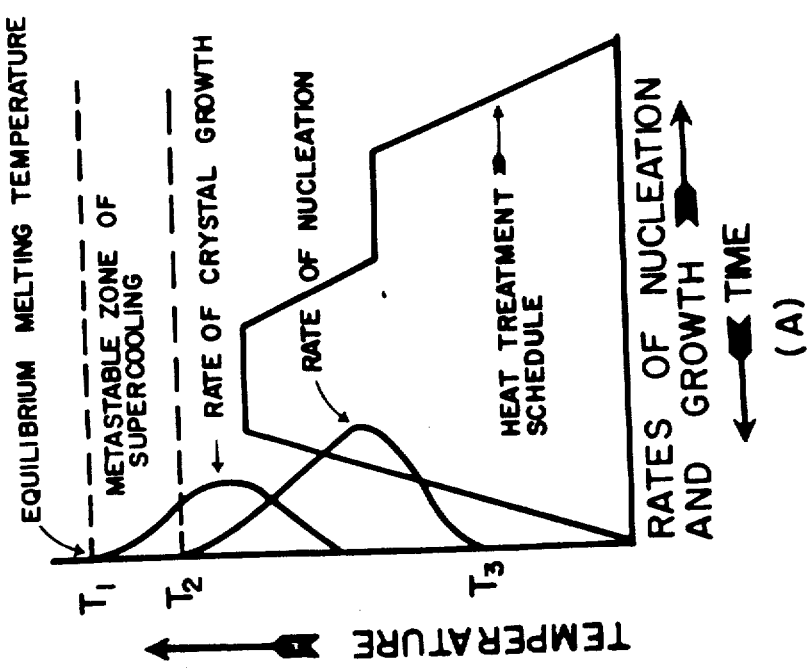
RATES OF NUCLEATION AND GROWTH WITHIN (A) CONVENTIONAL AND (B) SPONTANEOUSLY FORMED GLASS-CERAMIC SYSTEMS